United States Patent [19]

Yamanaka

[11] Patent Number: 4,658,206

[45] Date of Patent: Apr. 14, 1987

[54] FAULT DETECTOR FOR COMMUNICATIONS EQUIPMENT USING EXCLUSIVE OR CIRCUITRY

[75] Inventor: Osamu Yamanaka, Nishinomiya, Japan

[73] Assignee: Mitsubishi Denki Kabushiki Kaisha, Tokyo, Japan

[21] Appl. No.: 687,761

[22] Filed: Dec. 31, 1984

[30] Foreign Application Priority Data

Jan. 18, 1984 [JP] Japan .................................. 59-7541
Mar. 13, 1984 [JP] Japan .................................. 59-49733

[51] Int. Cl.$^4$ ........................................... G01R 31/02
[52] U.S. Cl. ........................................ 324/51; 455/67; 307/471; 324/52
[58] Field of Search .................... 324/51, 52, 54, 58 B, 324/58.5 B; 179/175.3 F; 307/511, 514, 471; 328/110; 368/120; 455/67

[56] References Cited

U.S. PATENT DOCUMENTS 4,020,422 4/1977 Underhill ........................ 307/511 X
4,023,154 5/1977 Comeaux ............................. 324/52
4,151,459 4/1979 Fayolle et al. ..................... 324/52

Primary Examiner—Reinhard J. Eisenzopf
Assistant Examiner—Jack B. Harvey
Attorney, Agent, or Firm—Birch, Stewart, Kolasch & Birch

[57] ABSTRACT

A fault detector is designed to detect abnormality of a transmission apparatus which transmits burst type signals such as a satellite communications equipment by wave-reforming the input and the output signal of the transmission apparatus, and executing an exclusive OR operation to both wave-reformed signals. An exclusive OR circuit which executes an exclusive OR operation by detecting whether either of the two wave-reformed signals exists at the rising or the falling of the other wave-reformed signal provides a highly precise result. An exclusive OR circuit which assures that the signal level is within a predetermined range at wave-reforming the output signal of the transmission apparatus enhances the preciseness to a greater extent in detection of abnormality.

6 Claims, 7 Drawing Figures

FAULT DETECTOR FOR COMMUNICATIONS EQUIPMENT USING EXCLUSIVE OR CIRCUITRY

FIELD OF THE INVENTION

The present invention relates to a fault detector for detecting abnormality of a transmission apparatus such as a TDMA (Time Division Multiple Access) transmitter which includes a transmission frequency converter or a power amplifier and transmits burst type signals.

BACKGROUND OF THE INVENTION

Recently, the TDMA communication system has been adapted to the field of satellite communications, and accordingly new techniques are required for detecting a fault of the device itself in a transmission apparatus including a transmission frequency converter or a power amplifier.

One example of a prior art fault detector used in a FDM-FM system is shown in FIG. 1. The signal output from the modulator 1 is input to the transmission frequency converter 2. The frequency-converted signal is amplified by the power amplifier 3, and it is transmitted from an antenna 4. In such a device, correct signal transmission is detected as follows:

The output of the power amplifier 3 is dividedly taken out by a directional coupler 5, and it is detected by a detector 6 or a like power sensor. The detected output is amplified by a d.c. amplifier 7, and a window comparator 8 or the like detects whether the level of the output of the d.c. amplifier 7 is within a permissible range (decided by an upper and a lower predetermined level). Thus, the abnormality of the device is detected. By providing a similar circuit at the output side of the transmission frequency converter 2, it is possible to detect abnormality in the path to the transmission frequency converter 2.

In conventional FDM-FM systems such a method for detecting abnormality can be used because the power of transmission output is usually constant. However, such a detecting circuit, cannot operate as an abnormality detector in transmission system of so-called burst mode signals because the transmission output is switched ON/OFF constantly, thereby making the output level non-constant in these systems. Furthermore, in TDMA communication systems various types of burst mode signals which have different lengths and intervals are transmitted. Accordingly, when the detector shown in FIG. 1 is used in such a transmission system, it is necessary to make the time constant of the above-described circuit large so as to detect the average power of the transmission output. But, such construction cannot operate satisfactorily.

OBJECTS AND SUMMARY OF THE INVENTION

It is an object of the present invention to provide a fault detector capable of detecting abnormality of a transmission apparatus which transmits burst type signals with a simple construction.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, the abnormality of a transmission apparatus which transmits burst type signals is detected by an exclusive OR circuit which executes an exclusive OR operation to the input and output signal of the transmission apparatus.

DETAILED DESCRIPTION OF THE PREFERRED EMBODIMENTS

The present invention aims at realizing detection of a fault in a transmission apparatus which transmits burst type signals easily and with a simple construction by executing an exclusive OR operation to the input and the output signal of the transmission apparatus.

Figure 2:
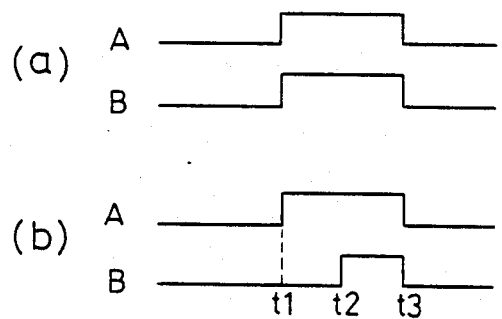
FIG. 2 is a diagram showing signal waveforms for explaining the principle of operation of the present invention.

The principle of the present invention is described with reference to FIG. 2.

As shown in FIG. 2(a), the respective time periods when the input signal A exists and when the output signal B exists coincide with each other if it is presumed that a delay time does not exist in the transmission system. However, if any portion of either of the signals A and B ceases, the exclusive OR of the two signals becomes "H" between the timings t1 and t2 shown in FIG. 2(b). Accordingly, it is possible to detect that an abnormality has arisen in the transmission system when the exclusive OR of the input and the output signal becomes "H".

Figure 1:
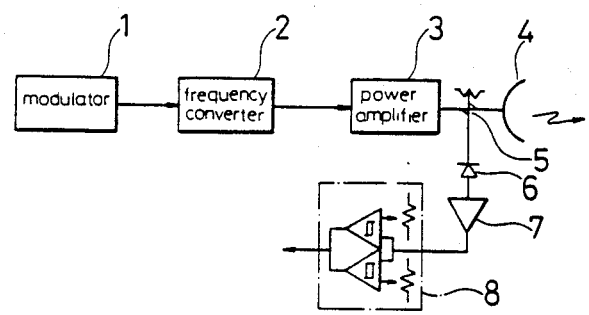
FIG. 1 is a circuit diagram showing a prior art fault detector.
Figure 3:
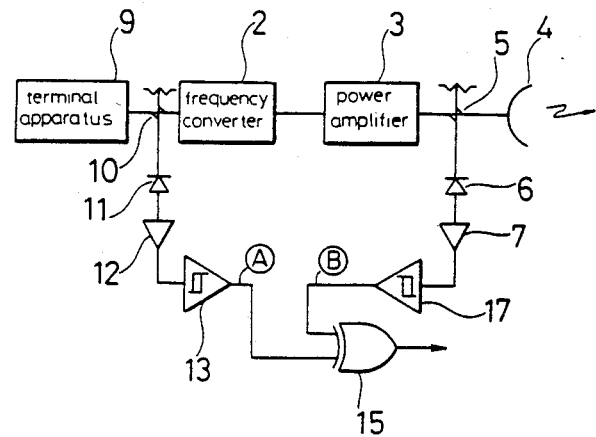
FIG. 3 is a circuit diagram showing a fault detector as one embodiment of the present invention.

One embodiment of the present invention is described with reference to FIG. 3. In the Figure, the reference numerals 2 to 7 designate the same elements as those in FIG. 1. The reference numeral 9 designates a TDMA terminal apparatus including a TDMA modulator or a TDMA modem. The output of the TDMA terminal apparatus 9 is transmitted to the transmission frequency converter 2. At the output of the terminal apparatus 9, that is, at the input of the frequency converter 2 an IF directional coupler 10, a diode detector 11, and a d.c. amplifier 12 which are the same as elements 5 to 7 are provided, and furthermore a comparator 13 is connected to the d.c. amplifier 12, thereby to constitute a pulse-wave-reformer for obtaining a rectangular pulse in accordance with the input burst signal. Also, at the output side of the transmission apparatus a comparator 17 which is similar to the comparator 13 is connected to the d.c. amplifier 7, thereby to constitute a pulse-wave-reformer together with the elements 5 to 7 for obtaining a rectangular pulse in accordance with the output burst signal. An exclusive OR circuit 15 is provided so as to execute an exclusive OR operation to both rectangular pulses, thereby enabling detection of an abnormality in the transmission apparatus, that is, abnormality in the transmission frequency converter 2 or the power amplifier 3 regardless of whether the signals exists or not.

Figure 4:
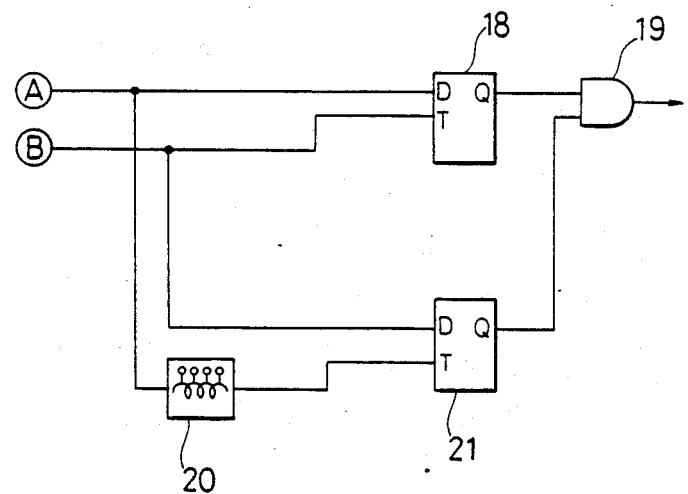
FIG. 4 is a circuit diagram showing details of an exclusive OR circuit in the circuit of FIG. 3.

Hereupon, when a usual exclusive OR circuit is used in this fault detector, a transient spike is likely to occur in the waveform at both ends of the input signal A and the output signal B shown in FIG. 2(a), thereby making it difficult to judge whether the output of the circuit is "H" or "L". Accordingly, it is better to judge whether either of the two signals exists or not at the rising or the falling of the other signal which is delayed relative to the former signal. There may be a case where it is unnecessary to provide a delay circuit because the output signal is usually delayed relative to the input signal. The circuit shown in FIG. 4 is designed to prevent malfunctions caused by such slight variations in timing. FIG. 4 shows a portion of the circuit below the points A and B in FIG. 3.

The reference numerals 18 and 21 designate usual edge trigger type first and second D flip-flops both of which output "H" from its Q output at the rising of the input to the T terminal if the D terminal is "H" at that timing. The numeral 20 designates a delay circuit usually constituted by a monostable multivibrator. There is usually not provided a delay circuit because the signal at point B is usually delayed with respect to that at point A. The numeral 19 designates an AND circuit.

The device operates as follows:

A signal from the point A is input to the D input of the first D flip-flop 18, and a signal from the point B is input to the clock input T thereof, the Q output thereof becoming "H" when the signal A is already in the state of "H" at the rising of the pulse from the point B, and becoming "L" when the signal A is in the state of L at that timing. On the other hand, the signals A and B are input to the second D flip-flop 21 in a reverse relation with relative to the inputs of the first D flip-flop 18, and it is judged whether the signal B exists or not a predetermined time after the rising of the signal A. Accordingly, it is possible to judge as normal when the Q outputs of the D flip-flops 18 and 21 are both "H", and as abnormal when either of them becomes "L", when the other is "H".

In this way it is judged whether either of the two signals exists or not at the rising of the other signal in the circuit of FIG. 4, whereby malfunctions caused by slight variations in timings can be prevented to result in a highly precise result. However, it is more preferable to prevent any malfunction caused by slight deviations in timings by conducting the above-described judgment both at the rising and the falling of the signals.

Figure 5:
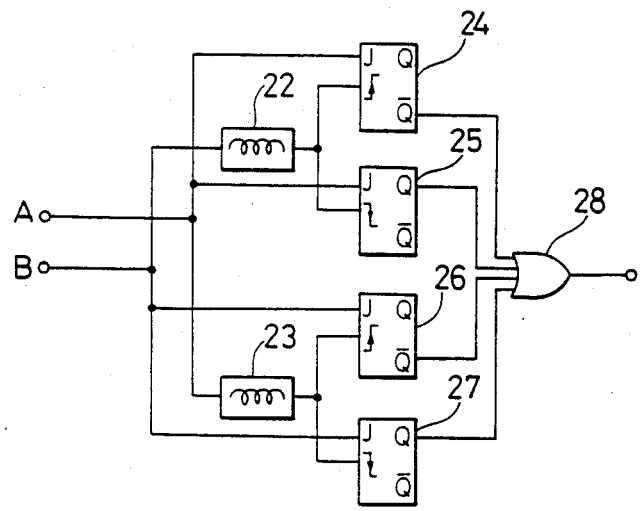
FIG. 5 is a circuit diagram showing another exclusive OR circuit.

FIG. 5 shows a circuit diagram of a second example of an exclusive OR circuit which aims at the above-described object. The reference numeral 22 designates a delay circuit which delays the output signal B. This can be abbreviated when the output signal is delayed relative to the input signal. The numeral 23 designates a delay circuit which delays the input signal A. The numerals 24 and 26 designate flip-flops which output "H" from the Q terminal and "L" from the $\overline{Q}$ terminal when the J terminal is "H" at the rising of the clock signal. These flip-flops 24 and 26 operate to judge whether either of the two signals exists or not at the rising of the other signal. The numerals 25 and 27 designate flip-flops which output "H" from the Q terminal and "L" from the $\overline{Q}$ terminal when the J terminal is "H" at the falling of the clock signal. These flip-flops operate to judge whether either of the two signals exists or not at the falling of the other signal. The numeral 28 designates an OR circuit.

In this circuit of FIG. 5, the OR circuit 28 outputs a signal "H" indicating that the apparatus is in an abnormal state only when an abnormality exists in the apparatus 2 or 3, that is, only when the exclusive OR of the signals A and B becomes "H".

In a satellite communication, the level of electric waves transmitted towards the satellite from a station on earth is restricted severely so as to maintain the channel quality of the station and to suppress interferences to other stations. This makes it unavoidably necessary to supervise the level of the transmission of the station.

The third embodiment of the present invention is described with reference to FIG. 6, wherein the reference numerals 2 to 13 are used to designate like and corresponding elements as those in FIG. 3. This embodiment is constituted in such a manner that the output of the TDMA terminal apparatus including a TDMA modulator or a TDMA modem is transmitted to the transmission frequency converter 2, and also to the IF directional coupler 10, a diode detector 11, a d.c. amplifier 12, and a comparator 13 which together constitute a pulse wave reformer, thereby to output a rectangular pulse in accordance with the input burst signal.

On the other hand a comparator 30 for detecting that the level of the output signal is above a level L1 and a comparator 31 for detecting that the level of the output signal is above a level L2 are provided connected to the d.c. amplifier 7 at the output side of the transmission apparatus, thereby constituting a pulse-wave-reformer together with the elements 5 to 7. The exclusive OR of both rectangular signals is obtained by the exclusive OR circuit comprising the circuit 32, 33, 34, thereby enabling detection of an abnormality of the transmission apparatus regardless of whether the signals exist or not. Hereupon, the numeral 29 designates a delay circuit which delays the signal A so that it can be judged whether the output signal B exists or not at the rising of the input signal A. The comparators 30 and 31 can be constituted easily by using operational amplifiers. The flip-flops 32, 33 can be constituted by similar ones as those shown in FIG. 5. The delay circuit 29 can be constituted by a monostable multivibrator. The numeral 34 designates an OR circuit which outputs an alarm signal when the exclusive OR becomes "H".

The operation of the device of FIG. 6 will be described with reference to FIG. 7 which shows a timing diagram of FIG. 6.

The input signal A shown in FIG. 7(a) is converted into a rectangular signal by the comparator 13 and it is delayed by the delay circuit 29 to have a waveform shown in FIG. 7(b). Now, it is supposed that the output signal B shown in FIG. 7(c) is transmitted normally between the timings t1 and t2, but the level of the output signal B has become too small between the timings t3 and t4, and too large between the timings t5 and t6 by an abnormal transmission. In such a case the output signal B is input to the comparator 30 which has the reference level L1 shown in FIG. 7(d) and to the comparator 31 which has the reference level L2 also shown in FIG. 7(d), and the comparators 30 and 31 output the signals shown in FIG. 7(e) and (f), respectively. It is judged where there is a transmission abnormality or not between timings t1 and t2 based on whether an output is obtained from the D flip-flops 32 or 33 at the timing $t_{12}$ of rising of the input signal b or not. The Q output of the D flip-flop 33 and the $\overline{Q}$ output of the D flip-flop 32 are shown in FIG. 7(g) and (h), respectively.

Between the timings t1 and t2, the $\overline{Q}$ output of the D flip-flop 32 becomes "L" because the comparator 30 outputs a signal, and the Q output of the D flip-flop 33 becomes "L" because the comparator 31 does not output a signal, and accordingly, the output of the OR circuit 34 becomes "L". Between the timings t3 and t4 the comparators 30 and 31 do not output a signal, and accordingly, the $\overline{Q}$ output of the D flip-flop 32 becomes "H" and the Q output of the D flip-flop 33 becomes "L" at the timing $t_{34}$ of rising of the input signal, whereby an alarm signal is output from the OR circuit 34. Between the timings t5 and t6 both of the comparators 30 and 31 output a signal, and accordingly, the $\overline{Q}$ output of the D flip-flop 32 becomes "L" and the Q output of the D flip-flop 33 becomes "H" at the timing $t_{56}$ of rising of the input signal, whereby an alarm signal is output from the OR circuit 34.

Figure 6:
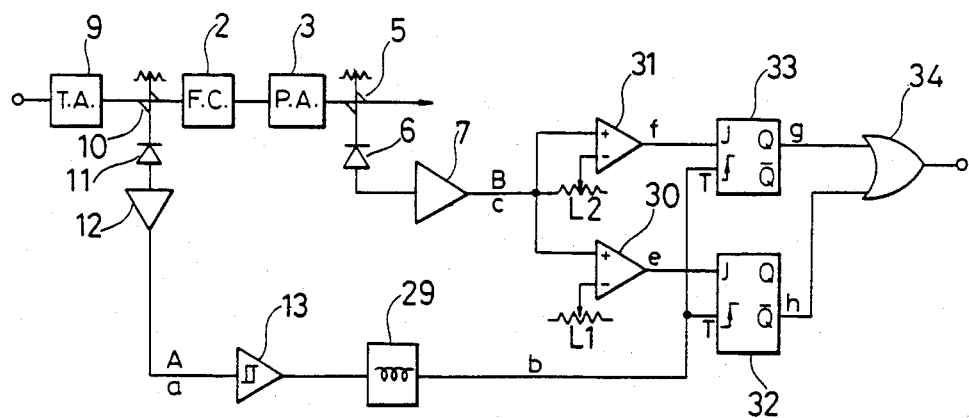
FIG. 6 is a circuit diagram showing a fault detector as the second embodiment.
Figure 7:
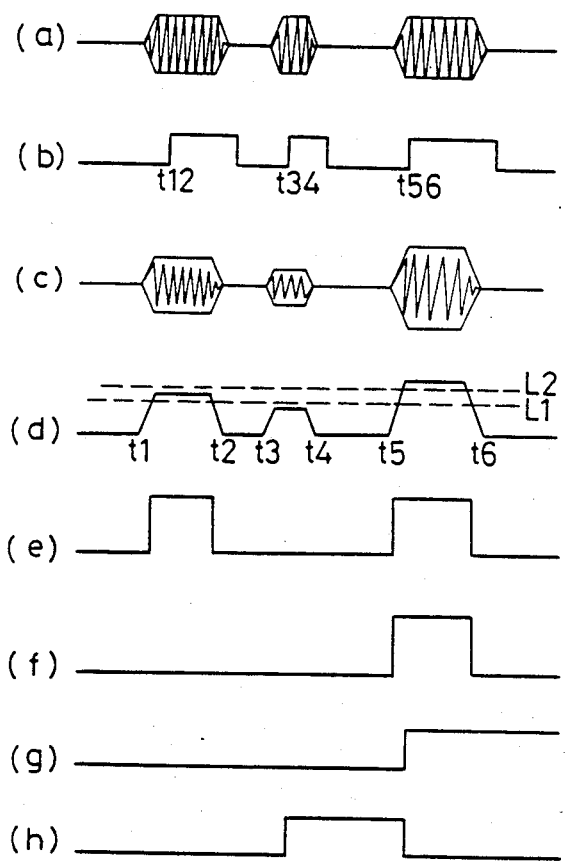
FIG. 7 is a timing diagram explaining the operation of the circuit of FIG. 6.

In this embodiment of FIG. 6, a fault in a transmission apparatus which transmits burst type signals is detected easily and with a simple construction, and with a high preciseness by confirming that the output level is within a predetermined range, and further executing an exclusive OR operation to the input and the output signals.

According to the present invention, it is judged whether either of the input and the output signal exists or not a predetermined time after the rising or the falling of the other signal, thereby enabling a judgment of whether the apparatus is in a normal or abnormal state quite easily by establishing the predetermined time properly from the burst lengths (pulse widths) of the burst type signals and the intervals therebetween. Such construction can avoid a malfunction which is likely to occur at the rising and the falling of the pulse signal in a case where a usual exclusive OR circuit is used.

In the above-illustrated embodiments, a TDMA signal is used, but the present invention can be effectively applied to abnormality detection in SCPC systems where carriers are ON/OFF in accordance with whether audio signals exist or not, or in carrier ON/OFF circuits in modulators.

What is claimed is:

1. A fault detector for detecting abnormalities in communication transmission equipment which transmits burst-like communication signals, comprising:
   first pulse wave reformer means for detecting a burst-like signal inputted at an input terminal of the equipment and for producing a first square wave pulse corresponding thereto;
   second pulse wave reformer means for detecting a burst-like communication output signal at an output terminal of the equipment and for producing a second square wave pulse corresponding thereto;
   exclusive OR means responsive to said first and second square wave pulses for performing an exclusive OR operation on said first and second pulses and outputting an error signal indicative of a fault in the equipment when either of said first and second pulses is present in the absence of the other.

2. A fault detector as claimed in claim 1, wherein the exclusive OR means comprises a circuit which detects whether either of the first and second pulses of the two pulse-wave-reformers exists at the rising of the other pulse.

3. A fault detector as claimed in claim 1, wherein the exclusive OR means comprises:
   a first detector which detects whether either of the first and second pulses of the two pulse-wave-reformers exists at the rising of the other pulse;
   a second detector which detects whether either of the first and second pulses of the two pulse-wave-reformers exists at the falling of the other pulse; and
   an OR circuit which outputs a logical sum of the output signals of the first and the second detectors.

4. A fault detector as claimed in claim 3, wherein the first detector comprises:
   a flip-flop which detects whether the output signal of the second pulse-wave-reformer exists at the rising of the output signal of the first pulse-wave-reformer; and
   a flip-flop which detects whether the output signal of the first pulse-wave-reformer exists at the rising of the output signal of the second pulse-wave-reformer, and the second detector comprises,
   a flip-flop which detects whether the output signal of the second pulse-wave-reformer exists at the falling of the output signal of the first pulse-wave-reformer, and
   a flip-flop which detects whether the output signal of the first pulse-wave-reformer exists at the falling of the output signal of the second pulse-wave-reformer.

5. A fault detector as claimed in claim 1, wherein the second pulse-wave-reformer includes:
   a first comparator which detects whether the level of the output signal of the transmission apparatus is above is first level L1; and
   a second comparator which detects whether said level of the output signal is above a second level L2.

6. A fault detector as claimed in claim 5, wherein the exclusive OR means includes:
   a first detector which detects whether the output signal of the first comparator exists at the rising of the square wave pulse of the first pulse-wave-reformer;
   a second detector which detects whether the output signal of the second comparator exists at the rising of the square wave pulse of the first pulse-wave-reformer; and
   and OR circuit which outputs a logical sum of the output signals of both detectors.

* * * * *